United States Patent [19]

Taubitz et al.

[11] Patent Number: 4,866,114

[45] Date of Patent: Sep. 12, 1989

[54] SELF-EXTINGUISHING, THERMOPLASTIC POLYPHENYLENE ETHER/POLYAMIDE MOLDING MATERIALS AND THEIR USE FOR THE PRODUCTION OF MOLDINGS

[75] Inventors: Christof Taubitz, Wachenheim; Hermann Gausepohl, Mutterstadt; Klaus Boehlke, Hessheim, all of Fed. Rep. of Germany

[73] Assignee: BASF Aktiengesellschaft, Ludwigshafe, Fed. Rep. of Germany

[21] Appl. No.: 250,170

[22] Filed: Sep. 28, 1988

[30] Foreign Application Priority Data

Sep. 30, 1987 [DE] Fed. Rep. of Germany ....... 3732907

[51] Int. Cl.$^4$ ............................................. C08K 5/34
[52] U.S. Cl. ................................... 524/100; 524/101
[58] Field of Search ................ 524/100, 101; 525/391, 525/392, 397

[56] References Cited

U.S. PATENT DOCUMENTS

| | | | |
|---|---|---|---|
| 3,663,495 | 5/1972 | Michael et al. | 260/37 |
| 4,315,086 | 2/1982 | Ueno et al. | 525/391 |
| 4,317,766 | 3/1982 | Kawasaki et al. | 524/101 |
| 4,336,184 | 6/1982 | Halpern | 524/100 |
| 4,339,376 | 7/1982 | Kasahara et al. | 524/116 |
| 4,525,505 | 6/1985 | Bonten et al. | 524/100 |
| 4,543,378 | 9/1985 | Suhara et al. | 524/100 |

FOREIGN PATENT DOCUMENTS 164767 12/1985 European Pat. Off.
101207 4/1987 European Pat. Off.
253123 1/1988 European Pat. Off.

*Primary Examiner*—Veronica P. Hoke
*Attorney, Agent, or Firm*—Oblon, Spivak, McClelland, Maier & Neustadt

[57] ABSTRACT

Self-extinguishing, thermoplastic polyphenylene ether/polyamide molding materials contain, as essential components, (A) from 10 to 90% by weight of component (A), which consists of ($A_1$) from 70 to 99% by weight of a modified polyphenylene ether, ($A_2$) from 1 to 30% by weight of a compound containing bound phosphorus, the percentages by weight being based on the total weight of component (A), and (B) from 90 to 10% by weight of component (B), which consists of ($B_1$) from 80 to 99% by weight of one or more polyamides and ($B_2$) from 1 to 20% by weight of one or more compounds containing a bound triazine radical and from the group consisting of cyanuric acid and its derivatives.

7 Claims, No Drawings

SELF-EXTINGUISHING, THERMOPLASTIC POLYPHENYLENE ETHER/POLYAMIDE MOLDING MATERIALS AND THEIR USE FOR THE PRODUCTION OF MOLDINGS

The present invention relates to novel self-extinguishing, thermoplastic polyphenylene ether/polyamide molding materials which contain, as essential components, (A) a component (A) which consists of a modified polyphenylene ether (A1) and a compound containing bound phosphorus and
(B) a component (B) which consists of one or more polyamides (B1) and a compound containing a bound triazine radical and from the group consisting of cyanuric acid and its derivatives,
(C) with or without an impact-modifying rubber and
(D) with or without additives.

Polyphenylene ethers are plastics having very good thermal, mechanical and electrical properties; however, they have only very poor resistance to solvents. This also applies to a commercial mixture of polyphenylene ether and styrene polymers. The usefulness of such products is therefore limited.

According to U.S. Pat. No. 3,379,792, the melt flow properties of polyphenylene ethers can be improved by adding up to 25% by weight of a polyamide. This patent furthermore states that other properties of the polyphenylene ether are very adversely affected when more than 20% by weight of polyamide are added.

GB-A No. 054 623 furthermore discloses blends of polyphenylene ethers and polyamides having fairly high polyamide contents: in order to obtain good properties, however, it is necessary to carry out a relatively long mixing process in the melt. At such high temperatures over fairly long periods, however, degradation readily occurs.

EP-A No. 24 120 (U.S. Pat. No. 4,315,086) and EP-A No. 46 040 (U.S. Pat. No. 4,339,376) described blends of polyamides, unmodified polyphenylene ethers and maleic anhydride and/or maleimide. The materials described in these patents and the moldings produced therefrom have an unsatisfactory impact strength, in particular when rubber is used as an additional component, and a melt flow index (MFI) which is far too low for many intended uses.

Thermoplastic molding materials which contain, as essential components, a polyamide and a modified polyphenylene ether and may or may not contain an unmodified polyphenylene ether, a vinylaromatic polymer and an impact-modifying rubber are described in EP-A-No. 0 253 123. Molding materials have good processability and balanced thermal, mechanical and dielectric properties, their good impact strength (including multiaxial impact strength) and their resistance to solvents being noteworthy in particular. All that is unsatisfactory is the flame retardance of the molding materials, since self-extinguishing products are required for some applications.

It is known that the combustibility of plastics can be reduced by admixing flame-retardant substances. However, these flame-retardant additives are not equally suitable for all types of plastics; instead, separate systems have to be found for each type of plastic.

According to DE-B-No. 18 03 606 (U.S. Pat. No. 3,663,495), self-extinguishing polyamide molding materials which contain from 0.1 to 25% by weight, based on the molding materials, of a combination of melamine or melamine derivatives and tetrahalophthalic anhydrides, tetrahalophthalimides or tetrahalophthalamides as a flame-retardant additive are obtained.

To improve the adhesion to various coatings, according to EP-A-No. 0 101 207, inorganic fillers and compounds containing triazine rings are incorporated in polyamide materials. Nothing is disclosed about the flame retardance of the molding materials.

Polyamide molding materials flameproofed with melamine are also disclosed in DE-A-No. 32 48 330 (U.S. Pat. No. 4,525,505). The disadvantage of such molding materials is the migration of the melamine from thin-walled moldings produced therefrom; this migration can be reduced by adding from 1 to 7% by weight, based on the total weight of the polyamide molding material, of one or more thermoplastic polyacetals.

EP-A-No. 0 164 767 discloses polymer blends based on polyphenylene ethers and polyamides, the mechanical properties of these blends being improved by incorporating oxidized polyolefin waxes and, if required, phosphites, which act as crosslinking agents. However, the patent publication contains no information about the behavior of the products in a fire.

It is an object of the present invention to provide self-extinguishing, thermoplastic polyphenylene ether/polyamide molding materials which have good mechanical properties and fulfil the classification V-0 or better in the fire test by the UL 94 test method. Compared with known flame-retardant polyphenylene ether/polyamide molding materials, the intention is to improve the mechanical properties, in particular the impact strength, or to equip molding materials having good processability and good mechanical properties, as described in, for example, EP-A-No. 0 253 123, to be flame-retardant without a deterioration in the other properties.

We have found that this object is achieved, surprisingly, by the use of specifically modified polyphenylene ethers as components for the polyphenylene ether/polyamide molding material, and a selected combination of flameproofing agents.

The present invention thus relates to self-extinguishing, thermoplastic polyphenylene ether/polyamide molding materials which contain, as essential components, (A) from 10 to 90% by weight of component (A), which consists of
(A1) from 70 to 99% by weight of a modified polyphenylene ether prepared from
(a1) 4.95–99.95% by weight of polyphenylene ether,
(a2) 0–90% by weight of a vinylaromatic polymer,
(a3) 0.05–10% by weight of
(a31) fumaric acid and/or
(a32) a maleimide of the general formula I

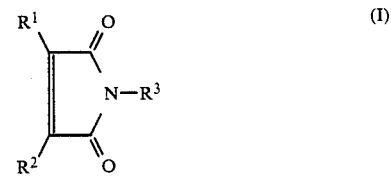

where $R^1$, $R^2$ and $R^3$ are each hydrogen or an alkyl, alkoxy, cycloalkyl, alkenyl, aryl, arylene or alkylene group of 1 to 12 carbon atoms, and/or ($a_{33}$) a monomer containing amide groups and a polymerizable double bond and/or ($a_{34}$) a monomer containing lactam groups and a polymerizable double bond and/or ($a_{35}$) a half ester or half amide of an $\alpha,\beta$-unsaturated dicarboxylic acid, ($a_4$) 0–80% by weight of further graft monomers and ($a_5$) 0–20% by weight of a free radical initiator, the percentages by weight of components ($a_1$) to ($a_5$) summing to 100% by weight, and (A2) from 1 to 30% by weight of a compound containing bound phosphorus, the percentages by weight being based on the total weight of component (A), (B) from 90 to 10% by weight of component (B), which consists of ($B_1$) from 80 to 99% by weight of one or more polyamides and ($B_2$) from 1 to 20% by weight of one or more compounds containing a bound triazine radical and from the group consisting of cyanuric acid and its derivatives, the percentages by weight being based on the total weight of component (B), (C) from 0 to 30% by weight of one or more impact-modifying rubbers and (D) from 0 to 60% by weight of one or more additives, the percentages by weight of components (A) to (D) summing to 100% by weight.

The compositions of preferred molding materials of this type are described in subclaims 2 to 6.

The present invention furthermore relates to the use of elf-extinguishing, thermoplastic polyphenylene ether/polyamide molding materials as claimed in claims 1 to 6 for the production of molding materials, and the molding materials produced from the self-extinguishing, thermoplastic polyphenylene ether/polyamide molding materials as claimed in claims 1 to 6.

Regarding the starting components which are suitable for the preparation of the novel self-extinguishing, thermoplastic polyphenylene ether/polyamide molding materials, the following may be stated:

(A) The novel molding materials contain, as component (A), from 10 to 90, preferably from 20 to 80, in particular from 30 to 70, % by weight of a mixture which consists of (A1) from 70 to 99, preferably from 80 to 98, % by weight of one or more modified polyphenylene ethers (A1) which is prepared from components a1, a2, a3 and, if required, a4 and a5, and (A2) from 1 to 30, preferably from 2 to 20, % by weight of a phosphorus-containing compound, the percentages by weight of the mixture being based on the total weight of the components (A1) and (A2).

Modification of the polyphenylene ethers (A1), also abbreviated to PPE below, is understood as meaning a change in the polyphenylene ether (a1) as a result of reaction of the components (a1) to (a5).

Component ($a_1$) is a conventional polyphenylene ether which can be prepared from phenols disubstituted in the o-position, for example by oxidative coupling. Preferably used polyphenylene ethers are those which are compatible with vinylaromatic polymers, i.e. are completely or substantially soluble in these polymers (cf. A. Noshay, Block Copolymers, pages 8–10, Academic Press, 1977, and O. Olabisi, Polymer-Polymer Miscibility, pages 117–189, Academic Press, 1979).

The proportion of component ($a_1$) is from 4.95 to 99.95, preferably from 10 to 99.95, in particular from 50 to 90, % by weight, based on the sum of components ($a_1$) to ($a_5$).

The polyphenylene ethers used generally have a weight average molecular weight of from 10,000 to 80,000, preferably from 15,000 to 60,000.

A few polyphenylene ethers, as mentioned by, inter alia, O. Olabisi, loc. cit., pages 224–230 and 245, are mentioned here merely by way of example, such as poly-(2,6-diethyl-1,4-phenylene) oxide, poly-(2-methyl-6-ethyl-1,4-phenylene) oxide, poly-(2-methyl-6-propyl-1,4-phenylene) oxide, poly-(2,6-dipropyl-1,4-phenylene) oxide, poly-(2-ethyl-6-propyl-1,4-phenylene) oxide and, preferably, poly-(2,6-dimethyl-1,4-phenylene) oxide, and copolymers, such as those which contain 2,3,6-trimethylphenol, as well as polymer blends. However, poly-(2,6-dimethyl-1,4-phenylene) oxide is particularly preferred.

Component ($a_2$), which may be present in the modified polyphenylene ether, is a vinylaromatic polymer which is preferably compatible with the polyphenylene ether used.

The weight average molecular weight of these polymers is in general from 1,500 to 2,000,000, preferably from 70,000 to 1,000,000.

Examples of preferred vinylaromatic polymers which are compatible with polyphenylene ethers can be found in the abovementioned monograph by Olabisi, pages 224–230 and 245. Vinylaromatic polymers of styrene, chlorostyrene, $\alpha$-methylstyrene and p-methylstyrene are mentioned here merely as typical examples; minor amounts (preferably not more than 20, in particular not more than 8, % by weight) of comonomers such as (meth)acrylonitrile or (meth)acrylates may also be present. A particularly preferred vinylaromatic polymer is polystyrene. Blends of these polymers can, of course, also be used.

Processes for the preparation of such vinylaromatic polymers are known per se and are described in the literature, so that further information is unnecessary here.

Merely by way of example, mass, suspension, emulsion and solution polymerization are mentioned here as suitable polymerization processes.

The amount of the vinylaromatic polymer ($a_2$) in component (A1) is from 0 to 90, preferably from 0 to 70, in particular from 0 to 60, % by weight.

When fumaric acid ($a_{31}$) is used as component ($a_3$), it has frequently proven advantageous if the molding materials have a certain minimum content of vinylaromatic polymer ($a_2$), preferably not less than 1.95, in particular not less than 4.95, % by weight, based on component (A1). The modified polyphenylene ether (A1) contains one or more compounds ($a_{31}$) to ($a_{35}$) as essential component ($a_3$).

In principle, it is also possible to use mixtures of different compounds ($a_{31}$) to ($a_{35}$), although it is generally advantageous to use only one of these types of compounds.

Component ($a_{31}$) is fumaric acid, which is particularly preferably used. Its amount is from 0.05 to 10, preferably from 0.1 to 5, % by weight, based on the sum of components ($a_1$) to ($a_5$).

Components ($a_{32}$) are maleimides of the general formula I

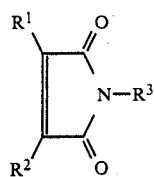
(I)

where $R^1$, $R^2$ and $R^3$ are each hydrogen or an alkyl, alkoxy, cycloalkyl, alkenyl, aryl, arylene or alkylene group of 1 to 12 carbon atoms.

$R^1$, $R^2$ and $R^3$ are each preferably alkyl of 1 to 4 carbon atoms, e.g. methyl, ethyl, n-butyl, isobutyl or tert-butyl, cycloalkyl of not more than 8 carbon atoms, in particular of 5 to 6 carbon atoms, or phenyl which may be substituted by alkyl or by alkoxy.

N-methylmaleimide, N-butylmaleimide, N-cyclohexylmaleimide, N-phenylmaleimide, N-(p-methylphenyl)-maleimide, N-(3,5-dimethylphenyl)-maleimide, N-(p-methoxyphenyl)maleimide, N-benzylmaleimide, N-(1-naphthyl)-maleimide and mixtures of these may be mentioned as examples of preferred maleimides. Among these, N-phenylmaleimide is particularly preferred.

The amount of the maleimide of the general formula I is from 0.05 to 10, preferably from 0.1 to 5, % by weight, based on the sum of the components ($a_1$) to ($a_5$).

Other suitable components ($a_3$) are monomers containing amide groups and one or more polymerizable double bonds, preferably those of the general formulae II or III

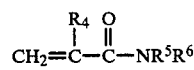
(II)

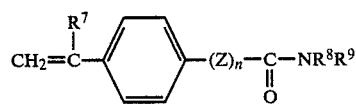
(III)

where $R^4$, $R^5$, $R^6$, $R^7$, $R^8$ and $R^9$ are each hydrogen, an alkyl or alkoxy group of 1 to 12 carbon atoms, cycloalkyl of not more than 12 carbon atoms or aryl, Z is alkylene of 1 to 12 carbon atoms and n is 0 or 1, preferably 0.

Preferred substituents $R^5$, $R^6$, $R^8$ and $R^9$ are alkyl of 1 to 10 carbon atoms, cycloalkyl of not more than 8 carbon atoms, in particular of 5 to 6 carbon atoms, and aryl, preferably phenyl. $R^4$ and $R^7$ are each preferably hydrogen or methyl.

Examples are acrylamide, N-methyl-, N-ethyl-, N-propyl-, N-butyl-, N-pentyl-, N-hexyl-, N-heptyl-, N-octyl-, N-nonyl- and N-(2-ethylhexyl)-acrylamide, N-cyclohexylacrylamide, N-phenylacrylamide, the corresponding N,N-derivatives, such as N,N-dimethylacrylamide, and the corresponding methacrylamides and mixtures of these.

Acrylamide, methacrylamide, N-phenylacrylamide and N-phenylmethacrylamide are preferably used.

The amount of component ($a_{33}$) is from 0.05 to 10, preferably from 0.1 to 10, in particular from 1 to 5, % by weight, based on the sum of components ($a_1$) to ($a_5$).

A monomer containing lactam groups and one or more polymerizable double bonds ($a_{34}$) can also be used as component ($a_3$).

Lactams of the general structure IV

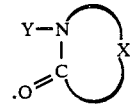
(IV)

where X is straight-chain or branched alkylene of 2 to 15 carbon atoms and Y is of the general formula

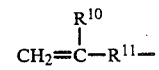

where $R^{10}$ is hydrogen or an alkyl or alkoxy group of 1 to 4 carbon atoms and $R^{11}$ is a divalent substituent of the formula

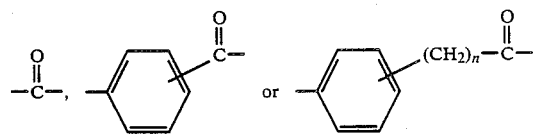

where n is an integer from 1 to 4, are preferably used.

Preferred substituents Y very generally are vinyl, acryloyl, methacryloyl and radicals based on styrene structures.

Lactam units which can be polymerized or copolymerized to give polyamides, as described in Houben-Weyl, Methoden der organ. Chemie, Volume X/2, pages 551-587 (1958) and Volume XIV/2, pages 111-131, are particularly preferred.

Examples are β-propiolactams (azetidin-2-ones), such as

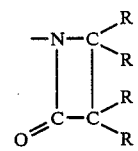

where the radicals R are identical or different alkyl groups of 1 to 6 carbon atoms or hydrogen. Compounds of this type are described in R. Graf, Angew. Chem, 74 (1962), 523–530, and A. Bastian, Angew. Chem. 80 (1968), 304–312.

3,3,-Dimethyl-3-propiolactam may be mentioned as one typical example of this group.

Other preferred lactam units are 2-methylpyrrolidones

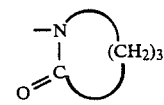

ε-caprolactam, such as

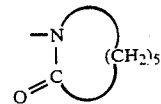

and also 7-enantholactam, 8-capryllactam and 12-Laurolactam, as described in K. Dachs, Angew. Chem. 74 (1962), 540–545. 2-Pyrrolidones and ε-caprolactams are particularly preferred.

Mixtures of these compounds can also be used.

Lactam units are preferably incorporated in the polyphenylene ethers (A1) via a carbonyl group on the nitrogen, as shown in general below.

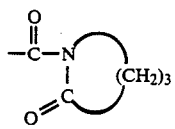

The only particularly preferred example of component (a34) given here is N-(meth)acryloyl-ε-caprolactam

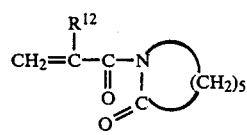

where $R^{12}$ is hydrogen or methyl.

The amount of component (a34) is from 0.05 to 10, preferably from 0.1 to 10, in particular from 0.5 to 5, % by weight, based on the sum of the components (a1) to (a5).

Components (a35) are half-esters or half-amides of α,β-unsaturated dicarboxylic acids. Examples of preferred dicarboxylic acids are maleic acid, fumaric acid, chloromaleic acid, dichloromaleic acid, methylmaleic acid, butenylsuccinic acid and tetrahydrophthalic acid, of which maleic acid and fumaric acid are particularly preferred.

For the preparation of suitable half-esters or half-amides, these acids or their anhydrides can be reacted with the corresponding alcohols or amines. Appropriate processes are known per se and are described in the literature, so that further information is unnecessary here.

Primary and secondary monoalcohols, such as methanol, ethanol, n-propanol, isopropanol, n-butanol, isobutanol, pentanols, hexanols, heptanols, octanols, e.g. 2-ethylhexyl alcohol, and higher alcohols, such as dodecanols, and cycloaliphatic alcohols, e.g. cyclohexanol, are preferably used as alcohols for the preparation of the half-esters. Other suitable alcohols are those having aromatic structural units, e.g. benzyl alcohol. In addition to C, H and O, the alcohols can also contain heteroatoms, such as N, O, S and Si, in the main chain or as substituents. Finally, alcohols having keto groups in the chain or having halogen substituents may also be mentioned. However, alkanols of 1 to 6 carbon atoms are preferably used.

Very generally, secondary amines and N-alkylanilines may be mentioned as amines for the preparation of the half-amides. Examples of these are N-methyl- and N-ethylalkylamines and N-methylaniline. Like the alcohols, the amines too can contain heteroatoms and functional groups.

Very generally, half-esters are preferred to half-amides. The amount of (a35) is from 0.05 to 10, preferably from 0.1 to 5, % by weight, based on the total weight of component (A1).

Molding materials which contain component (a35) frequently have particularly good flow properties, i.e. particularly high melt flow indices (MFI).

In the preparation of the modified polyphenylene ether (A1), it is also possible, if required, to use further comonomers (a4) which react with, or are grafted onto, the components (a1) and, where relevant, (a2) under the preparation conditions. Examples of these are acrylic acid, methacrylic acid, acrylates, methacrylates and- vinylaromatic monomers, such as styrene, α-methylstyrene and vinyltoluene, to mention but a few.

The amount of component (a4) is from 0 to 80, preferably from 0 to 45, in particular not more than 20, by weight, based on the sum of components (a1) to (a5). Molding materials which do not contain any components (a4) are particularly preferred.

Up to 20% by weight of free radical initiators can be used as component (a5) in the preparation of the modified polyphenylene ether (A1).

The amount of component (a5) is, as a rule, lower than the sum of the amounts of components (a3) and (a4). The component is preferably an organic peroxide or an azo compound.

Organic peroxides having a half-life of from 1 to 30 sec at 200° C. are particularly preferred. The choice of the free radical initiator depends on the desired reaction temperature.

Examples of free radical initiators are: di-(2,4-dichlorobenzoyl) peroxide, tert-butyl peroxide, di-(3,5,5-trimethylhexanol) peroxide, dilauroyl peroxide, didecanoyl peroxide, dipropionyl peroxide, dibenzoyl peroxide, tert-butyl peroxy-2-ethylhexanoate, tert-butyl peroxydiethylacetate, tert-butyl peroxyisobutyrate, 1,1-di-tert-butyl peroxy-3,3,5-trimethylcyclohexane, tertbutyl peroxyisopropyl carbonate, tert-butyl peroxy-3,3,5-trimethylhexanoate, tert-butyl peracetate, tertbutyl perbenzoate, butyl 4,4-di-tert-butyl peroxyvalerate, 2,2-di-tert-butylperoxybutane, dicumyl peroxide, tert-butyl cumyl peroxide, 1,3-di-(tert-butylperoxyiso-propyl)-benzene, di-tert-butyl peroxide, diisopropylbenzene monohydroperoxide, cumene hydroperoxide, tertbutyl hydroperoxide, 2,2-azobis-(2,4-dimethylvaleronitrile) and azobisisobutyronitrile, dicumyl peroxide being particularly preferred.

It has frequently proven advantageous to omit component (a5) from the process. This is true in particular when fumaric acid (a31) is used as component (a3), since in this case undesirable side reactions may occur in certain circumstances when free radical initiators are used.

For the preparation of the modified polyphenylene ether (A1), components (a1) to (a5) can be reacted with one another at from 250° to 350° C., preferably from 265° to 295° C. Extruders are particularly suitable for this purpose, since thorough mixing of the components can in general also be achieved therein. The residence times are in general from 0.5 to 30, preferably from 1 to 3, minutes. Twin-screw extruders are particularly useful for the process described.

A particularly preferred variant of the process is described below.

Components (a1) to (a5) are preferably metered in together and melted in a melting zone. The extruder screw in the melting zone preferably contains kneading elements. The melting zone is connected to the reaction zone, which preferably contains kneading elements and additional kneading elements having a downstream backward-conveying thread. A devolatilization zone for removing volatile components is preferably located upstream of the product discharge zone. The discharged melt is generally granulated and the granules used for the preparation of the novel molding materials.

In principle, the preparation of the modified polyphenylene ether (A1) can also be carried out in any reaction vessel which permits the components to react with one another.

It is sometimes advantageous if the modified polyphenylene ethers (A1) additionally contain an unmodified polyphenylene ether. This preferably corresponds to the polyphenylene ether used as component (a$_1$), and reference may therefore be made to the statements made there regarding suitable compounds. Where the unmodified polyphenylene ether is present, its amount is not more than 90, preferably less than 50, % by weight, based on the total weight of modified and unmodified polyphenylene ethers.

(A2) For flameproofing, component (A) contains, according to the invention, one or more compounds (A2) containing bound phosphorus, as flameproofing additives.

These are organic and inorganic phosphorus compounds in which the phosphorus is in the valency states −3 to +5. The valency state is understood as meaning the oxidation state, as described in Lehrbuch der Anorganischen Chemie by A. F. Hollemann and E. Wiberg, published by Walter de Gruyter and Co. (1964, 57th to 70th Edition), pages 166–177. Phosphorus compounds of valency states −3 to +5 are derived from phosphine (−3), diphosphine (−2), phosphine oxide (−1), elemental phosphorus (±0) hypophosphorous acid (+1), phosphorous acid (+3), hypodiphosphoric acid (+4) and phosphoric acid (+5).

Only a few examples are mentioned from the large number of phosphorus-containing compounds.

Examples of phosphorus-containing compounds of the phosphine class, which have a valence state of −3, are aromatic phosphines, such as triphenylphosphine, tritolylphosphine, trinonylphosphine, trinaphthylphosphine, etc. Triphenylphosphine is particularly suitable.

Examples of phosphorus compounds of the diphosphine class, which have a valence state of −2, are tetraphenyldiphosphine, tetranaphthyldiphosphine, etc. Tetranaphthyldiphosphine is particularly suitable.

Phosphorus compounds of valency state −1 are derived from phosphine oxide. Examples are triphenylphosphine oxide, tritolylphosphine oxide, trinonylphosphine oxide and trinaphthylphosphine oxide. Triphenylphosphine oxide is preferred.

Phosphorus of valence state ±0 is elemental phosphorus. Red phosphorus and black phosphorus are suitable, the former being preferred.

Phosphorus compounds of oxidation state +1 are, for example, hypophosphites. They may have a salt-like character or be purely organic compounds.

Examples are calcium hypophosphite and magnesium hypophosphite, as well as complex hypophosphites and double hypophosphites, and organic hypophosphites, such acids with diols, e.g. of 1,10-dodecyldiol. Substituted phosphinic acids and their anhydrides, e.g. diphenylphosphinic acid, can also be used. Melamine hypophosphite is also suitable. Other suitable compounds are diphenylphosphinic acid, di-p-tolylphosphinic acid, and dicresylphosphinic anhydride. However, compounds such as hydroquinone bis-(diphenylphosphinate), ethylene glycol bis-(diphenylphosphinate), propylene glycol bis-(diphenylphosphinate), etc., are also suitable. Other useful compounds are aryl (alkyl)phosphinamides, e.g. diphenylphosphinic acid dimethylamide, and sulfonamidoaryl(alkyl)phosphinic acid derivatives, e.g. p-tolylsulfonamidodiphenylphosphinic acid. Hydroquinone bis-(diphenylphosphinate) and ethylene glycol bis-(diphenylphosphinate) are preferably used.

Phosphorus compounds of oxidation state +3 are derived from phosphorous acid. Cyclic phosphinates which are derived from pentaerythritol, neopentylglycol or pyrocatechol are suitable. Phosphorus of valency state 3 is also present in triaryl(alkyl) phosphites, e.g. triphenyl phosphite, tris-(4-decylphenyl) phosphite, tris-(2,4-di-tert-butylphenyl) phosphite or phenyl didecyl phosphite, etc. However, diphosphites, e.g. propylene glycol 1,2-bis-(diphosphite), and cyclic phosphites which are derived from pentaerythritol, neopentylglycol or pyrocatechol are also suitable.

Methyl neopentylphosphonate (neopentyl methanephosphonate) and phosphite and dimethylpentaerythritol diphosphonate and diphosphite are particularly preferred.

Particularly suitable diphosphorus compounds of oxidation state +4 are hypodiphosphates, e.g. tetraphenyl hypodiphosphate or bisneopentyl hypodiphosphate.

Particularly suitable phosphorus compounds of oxidation state +5 are alkyl-substituted and aryl-substituted phosphates. Examples are phenyl bis-dodecyl phosphate, phenyl ethyl hydrogen phosphate, phenyl bis-(3,5,5-trimethylhexyl) phosphate, ethyl diphenyl phosphate, 2-ethylhexyl ditolyl phosphate, diphenyl hydrogen phosphate, bis-(2-ethylhexyl) p-tolyl phosphate, tritolyl phosphate, bis-(2-ethylhexyl) phenyl phosphate, dinonyl phenyl phosphate, phenyl methyl hydrogen phosphate, didodecyl p-tolyl phosphate, p-tolyl bis-(2,5,5-trimethylhexyl) phosphate or 2-ethylhexyl diphenyl phosphate.

Phosphorus compounds in which each radical is an aryloxy radical are particularly suitable. Triphenyl phosphate is very particularly suitable.

Cyclic phosphates can also be used, diphenyl pentaerythritol diphosphate and phenyl neopentyl phosphate being particularly suitable.

In addition to the abovementioned low molecular weight phosphorus compounds, oligomeric and polymeric phosphorus compounds are also suitable.

Such polymeric, halogen-free organic phosphorus compounds containing phosphorus in the polymer chain are formed, for example, in the preparation of pentacyclic, unsaturated phosphine dihalides, as described in, for example, German Laid-Open Application No. DOS 2,036,173. The molecular weight of the polyphospholine oxides should be from 500 to 7,000, preferably from 700 to 2,000, measured by vapor pressure osmometry in dimethylformamide.

The phosphorus has an oxidation state of −1 here.

Organic coordination polymers of aryl(alkyl)phosphinic acids, e.g. poly-[sodium(I) methylphenylphosphinate], can also be used. Their preparation is described in German Laid-Open Application No. DOS 3,140,520. The phosphorus has an oxidation state of +1.

Halogen-free polymeric phosphorus compounds which are formed by the reaction of a phosphonyl chloride, e.g. phenyl, methyl or propylphosphonyl dichloride, with a bifunctional phenol, e.g. hydroquinone, resorcinol, 2,3,5-trimethylhydroquinone, bisphenol A or tetramethylbisphenol A, can also be used.

Other halogen-free polymeric phosphorus compounds which are suitable as flameproofing additives are prepared by reacting phosphorus oxytrichloride or phosphoric ester dichlorides with a mixture of mono-, bi- and trifunctional phenols and other hydroxyl-containing compounds (cf. Houben-Weyl-Müller, Thieme-Verlag Stuttgart, Organische Phosphorverbindungen, Part II (1963)). Halogen-free polymeric phosphonaes can also be prepared by transesterification reactions of phosphonates with bifunction 1 phenols (cf. German Laid-Open Application No. DOS 2,925,208) or by reactions of phosphonates with di-amines or diamides or hydrazides (cf. U.S. Pat. No. 4,403,075). However, the inorganic poly-(ammonium phosphata) is also suitable.

Oligomeric pentaerythritol phosphites, phosphates and phosphonates according to European Patent No. 8,486, e.g. Mobil Antiblaze ® 19 (registered trade mark of Mobil Oil) can, however, also be used.

Dimethyl pentaerythritol diphosphonate, methyl neopentyl phosphate (neopentyl methanephosphonate), Mobil Antiblaze 19 and, in particular, triphenylphosphine oxide and/or triphenyl phosphate have proven particularly useful and are therefore preferably used.

The constituents (A1) and (A2) of component (A) can be added individually in the stated amounts and combined directly with constituents (B) and, where relevant, (C) and (D), for example in an extruder, for example a single-screw or twin-screw extruder, to give the novel polyphenylene ether/polyamide molding materials. In another embodiment, which is preferably used, the modified polyphenylene ether (A1) is first prepared in a first zone of an extruder by reacting components $(a_1)$ to $(a_3)$ and, where relevant, $(a_4)$ and/or $(a_5)$ at from 240° to 350° C., preferably from 260° to 300° C., during a reaction time (mean residence time in the extruder) of from 0.1 to 15, preferably from 0.1 to 10, in particular from 0.5 to 3, minutes, and the compounds (A2) which contain bound phosphorus and are suitable flameproofing additives are metered via one or more feed orifices into the downstream second zone of the extruder. The resulting melt is extruded via a devolatilization zone and a die, the extrudates are drawn through a water bath then granulated, and the granules are dried.

(B) The novel self-extinguishing, thermoplastic polyphenylene ether/polyamide molding materials contain, as component (B), from 90 to 10, preferably from 80 to 20, in particular from 70 to 30, % by weight of a mixture (B) which consists of (B1) from 80 to 99, preferably from 85 to 95, % by weight of one or more polyamides (B1) and (B2) from 1 to 20, preferably from 5 to 15, % by weight of one or more compounds (B2) which contain a bound triazine radical and are selected from the group consisting of cyanuric acid, cyanuric acid derivatives and mixtures of these, the percentages by weight being based on the total weight of components (B1) and (B2).

Suitable components (B1) are linear polyamides, for example those having a relative viscosity of from 2.2 to 4.5, measured in 1% strength by weight solution in 96% strength by weight sulfuric acid at 23° C. Polyamides which are derived from lactams having from 7 to 13 ring members, such as polycaprolactam, polycaprolactam or polylaurolactam, and polyamides obtained by reacting a dicarboxylic acid with a diamine are preferred. Examples of suitable dicarboxylic acids are alkanedicarboxylic acids of 6 to 12, in particular 6 to 10, carbon atoms and terephthalic acid and isophthalic acid as well as any mixtures of these acids.

Examples of diamines are alkanediamines of 6 to 12, in particular 6 to 8, carbon atoms, as well as m-xylylenediamine, bis-(4-aminophenyl)-methane, bis-(4-aminocyclohexyl)-methane and 2,2-bis-(4-aminophenyl)propane and mixtures of these.

It is also possible, and sometimes advantageous, to use blends of the stated polyamides. Nylon 6 (polycaprolactam), nylon 11, nylon 12, nylon 66 (polyhexamethyleneadipamide) and polyamides synthesized from hexamethylenediamine and isophthalic acid and terephthalic acid have become particularly important industrially.

A polycaprolactam having a weight average molecular weight of from 10,000 to 80,000, in particular from 10,000 to 70,000, as well as nylon 66, nylon 11 and nylon 12 have proven particularly suitable components (B1) and are therefore particularly useful.

(B2) For flameproofing, component (B) and hence, in particular, the novel molding material contain one or more triazine compounds selected from the group consisting of cyanuric acid, cyanuric acid derivatives and mixtures thereof. Examples of cyanuric acid derivatives are melamine, melam, melem, melamine cyanurate, methylene dimelamine, ethylene dimelamine and p-xylylidenedimelamine.

Cyanuric acid and in particular melamine and/or melamine cyanurate are preferably used, advantageously in mean particle sizes of less than 100 µm, preferably from about 1.5 to 30 µm.

Examples of suitable cyanuric acid derivatives include salts of melamine and inorganic acids, e.g. melamine phosphate, reaction products of melamine with triazolidine-3,5-diones or barbituric acid derivatives and formaldehyde, as well as melamine in combination with thermoplastic polyacetals, for example according to DE-A-No. 32 48 330.

Constituents (B1) and (B2) of component (B) can be fed in individually in the stated amounts, similarly to constituents (A1) and (A2) of component (A), and combined directly with constituents (A) or (A1) and (A2) and, where relevant, (C) and (D), for example in an extruder, to give the novel polyphenylene ether/polyamide molding materials.

However, component (B) can also be prepared separately by mixing components (B1) and (B2) at from 150° to 350° C., preferably from 250° to 320° C., in a conventional mixing apparatus, e.g. a kneader, a Banbury mixer or a single-screw or twin-screw extruder, and then further processed to give the novel molding materials, either directly or after temporary storage.

(C) The novel, self-extinguishing, thermoplastic polyphenylene ether/polyamide molding materials may contain, as a further component (C), one or more impact-modifying rubbers having a glass transition temperature of less than 0° C., preferably less than −20° C., in an amount of not more than 30, preferably from 2 to 25, in particular from 5 to 20, % by weight, based on the sum of the components (A) to (C) and, where relevant, (D). The skilled worker knows such impact-modifying rubbers as high impact polystyrene (HIPS) or ABS. The vinyl-aromatic polymers are prepared in the presence of an additive which improves the impact strength (impact modifier) or the vinylaromatic polymers are mixed with grafted rubbers. Examples of rubber-like polymers are polybutadiene, styrene/butadiene, styrene-p-butadiene, acrylonitrile/butadiene, ethylene/propylene/polyacrylate and polyisoprene rubbers.

The rubbers can be prepared in a conventional manner, and the sequence of addition of the individual monomers can be modified in a known manner. For example, the preparation by emulsion polymerization, it is possible first to polymerize the butadiene, with or without the addition of styrene acrylonitrile or a (meth)acrylate and with or without the addition of small amounts of crosslinking agents, and then to graft other monomers or mixtures, such as (meth)acrylates, acrylonitrile, styrene or other polymerizable monomers, onto the grafting base thus obtained.

In addition to the grafted rubbers which may be present as component (C), for example polybutadiene rubber, acrylate rubber, styrene/butadiene rubber, polybutene rubber, hydrogenated styrene/butadiene rubber, acrylonitrile/butadiene rubber, ethylene/butadiene rubber or polyisoprene rubber, these may also be added in ungrafted form in order to improve impact strength. Further examples of rubbers for this purpose are styrene-grafted ethylene/propylene rubbers, thermoplastic ethylene/propylene rubbers, thermoplastic polyesters elastomers, ethylene rubbers and ionomers and in particular styrene/butadiene block copolymers, including AB, ABA and ABAB tapered block copolymers, star block copolymers and similar isoprene block copolymers, as well as partially or completely hydrogenated block copolymers.

Other suitable rubbers are those which toughen the polyamide phase; such rubbers are described in, for example, Polymermodifizierte Polyamide by F. Fahnler and J. Merten (Kunststoffe, 75 (1985), 157–163), Polyamide by H. Kalsch (Plastverarbeiter, 33 (1982), 1065–1069), EP-A-Nos. 01 44 767 and 234 390. Particularly used substances are ethylene/acrylate/maleic anhydride, ethylene acrylate/acrylic acid and ethylene/acrylate/maleic anhydride/acrylic acid copolymers, preferably used acrylates being n-butyl acrylate, isobutyl acrylate, tert-butyl acrylate, 2-ethylhexyl acrylate or dodecyl acrylate, and butadiene rubbers, preferably those having a grafted shell which contains acrylic acid radicals or tert-butyl acrylate groups, and ethylene/propylene/diene rubbers, which are used with 0.3% by weight of maleic anhydride.

(D) In addition to components (A) and (B) which must be present, and (C) which may be present, the novel self-extinguishing, thermoplastic molding materials may contain conventional additives (D) in an amount of not more than 60, preferably not more than 40, in particular from 0.1 to 35, % by weight, based on the total weight of components (A) to (D). Such conventional additives, which include processing assistants, are, for example, heat stabilizers, light stabilizers, lubricants, mold release agents, colorants, e.g. dyes and pigments, etc. Further additives are reinforcing agents, e.g. glass fibers, carbon fibers, organic synthetic fibers or natural fibers, for example aromatic polyamide or polyester fibers, cellulose fibers, etc., and/or fillers, e.g. gypsum fibers, synthetic calcium silicate, kaolin, calcined kaolin, wollastonite, talc, chalk, etc.

The novel self-extinguishing, thermoplastic polyphenylene ether/polyamide molding materials are advantageously prepared by mixing components (A), (B) and, where relevant, (C) and (D) at from 200° to 350° C., preferably from 250° to 320° C., in a conventional mixing apparatus, for example a kneader, a Banbury mixer or, preferably, an extruder, for example a single-screw extruder or, in particular, a twin-screw extruder. In order to obtain a very homogeneous molding material, thorough mixing is essential; this can be achieved in a conventional manner. The residence times are in general from 0.5 to 30, preferably from 1 to 5, minutes. The order in which the components are mixed can be varied; two or, if required, three components can be premixed, or all of the components can be mixed together.

As stated above, the novel molding materials are preferably prepared in a single-screw or, in particular, a twin-screw extruder. These are preferably composed of individual barrels which have thermostatable jackets. The screw design is not subject to any restrictions, and conveying elements (with or without shear edges), kneading elements and/or mixing elements may be present It is also possible, and frequently advantageous, to use retarding or back-conveying elements in parts, i.e. sections, of the extruder in order to influence and control the residence time and mixing properties Because of the self-purging properties and the better adjustability of the residence time, twin-screw extruders having screws rotating in the same direction are particularly preferably used. The extruder is divided into 2 or more, preferably 3 or more, zones.

As described for the preparation of components (A), in a preferably used variant of the preparation, the modified polyphenylene ether (A1) is first prepared in the first zone of an extruder, in particular a twin-screw extruder, by reacting components ($a_1$) to ($a_3$) and, if required, ($a_4$) and/or ($a_5$), and the compounds (A2) which are suitable as flameproofing additives and contain bound phosphorus are metered via one or more feed orifices into the downstream second zone of the extruder. Components (B) or components (B1) and (B2) for this component, and, if required, components (C) and/or (D), can be added in a similar manner, individually in any order or in a certain order or together, via one or more feed orifices, to one extruder zone or different extruder zones. Metering is preferably effected by means of one or more lateral extruders which may have thermostatable jackets and into which the components are metered and in which the components are melted and advantageously fed to the beginning of the second zone of the extruder.

In general, the screw diameter of the lateral extruder is smaller than that of the main extruder and the screw length is from 5 to 40, preferably from 10 to 20, diameters. The temperature of the lateral extruder during metering into the main extruder is from 200° to 350° C., preferably from 250° to 320° C. The screw of the lateral extruder can be designed so that the components are premixed before being metered into the main extruder. The components are preferably melted in the lateral extruder.

The zone of the main extruder in which the modified polyphenylene ether (A1) is then mixed with the components metered from the beginning of the second zone generally has a length of from 5 to 40, preferably from 10 to 20, diameters. The temperature is in the same range as that during metering of the components B and, if required, (C) and/or (D). The mean residence times in this zone are in general from 0.1 to 10, preferably from 0.5 to 5, minutes.

In some cases, it is advantageous not to feed all components (B) to (D) simultaneously into the main extruder. In this case, one or more identical zones, into which the components (B) or (B1), (B2), (C) and/or (D) can be introduced via feed orifices, may be connected to the second zone of the main extruder. In these cases too, metering into the main extruder is effected via lateral extruders whose structure corresponds to the above-mentioned form or, in the case of fillers, such as glass fibers, via an orifice at the top. Substances may also be pumped in.

The structure and dimensions of the further zones of the main extruder into which the components are introduced correspond to the data for the second zone.

Particularly for the addition of rubbers, processing assistants and other conventional additives, it is frequently advantageous to use an extruder having more than two zones.

After the addition of all components, or mixtures of these, to the various zones of the main extruder, devolatilization may advantageously be carried out in a further zone. Suitable apparatus for such devolatilization zones is known. The length of this zone is preferably from 3 to 10 diameters and the temperature is from 240° to 350° C., devolatilization preferably being carried out under reduced pressure.

After any devolatilization which may have been carried out, the novel self-extinguishing, thermoplastic polyphenylene ether/polyamide molding materials are extruded from the extruder and if necessary stored or further processed directly in a conventional manner.

The novel molding materials are distinguished by their good balanced mechanical properties, in particular by their good multiaxial impact strength and good processibility and flame retardance.

They are used in particular for the production of moldings by injection molding or extrusion.

The flameproofing test described in the Examples and Comparative Examples were carried out by a vertical burning test according to the specifications of the Underwriters' Laboratories for classification in one of the fire classes UL 94, V0, V1, V2 or 5 V.

A flameproofed thermoplastic is classified in fire class UL 94 V0 if the following criteria are met: For a set of 5 samples measuring $127 \times 12.7 \times 3.16$ mm, all samples can continue burning after application of a flame twice for 10 seconds. The sum of the combustion times after 10 flame applications to 5 samples must not be longer than 50 seconds. None of the samples must drip flaming particles, burn completely or burn with glowing combustion for longer than 30 seconds. For classification in fire class UL 94 V1, the combustion times must not be longer than 30 seconds and the sum of the combustion times for 10 flame applications to 5 samples must not be longer than 250 seconds. Glowing combustion must never last longer than 60 seconds. The other criteria are identical to those mentioned above. A substance is classified in fire class UL 94 V2 when the above criteria for classification as UL 94 V1 are fulfilled and dripping of flaming particles occurs.

A substance is classified in fire class UL 94 V5 if the following criteria are met:

The combustion time or glowing combustion time of the samples must not exceed 60 seconds after the final flame application. A flame 127 mm high and having an inner blue cone 38 mm high is applied to each sample five times for 5 seconds. Two successive flame applications are separated in each case by an interval of 5 seconds. Neither dripping of flaming or nonflaming particles nor complete combustion must occur.

Furthermore, the total Plastechon W was determined in accordance with DIN 53,443, i.e. the damaging energy (Ultram ®, BASF-Kunststoffe, brochure of October 1986, page 14, FIG. 7).

EXAMPLES 1 TO 8 AND COMPARATIVE EXAMPLES I AND II (A1) Preparation of the modified polyphenylene ether (A1)

Polyphenylene ether A11:

94 parts by weight of poly-(2,6-dimethyl-1,4-phenylene) ether having a relative viscosity of 0.63, measured in 1% strength by weight $CHCl_3$ solution at 25° C., 3.5 parts by weight of polystyrene (PS 144 C from BASF, MFI 200/5.0=24 g/10 min) and 2.5 parts by weight of fumaric acid were metered into a twin-screw extruder (ZSK 53) from Werner & Pfleiderer, melted in a first zone using kneading elements at 280° C., reacted in a second zone with kneading and with the use of retarding kneading elements at 280° C. and then devolatilized in a devolatilization zone at 275° C. under reduced pressure. The mean residence time in the extruder was 2.5 minutes. The emerging melt was passed through a water bath and granulated, and the granules were dried.

Polyphenylene ether A12:

The procedure was similar to that for the preparation of polyphenylene ether (A11), except that the following starting materials were used:

93 parts by weight of the polyphenylene ether,
3.5 parts by weight of monomethyl fumarate and
3 parts by weight of polystyrene.

The following were used as components (A2), (B1) and (B2) and components (C) and (D) for the preparation of the novel molding materials:

A2: Compounds containing bound phosphorus:
A21: Triphenylphosphate and
A22: Triphenylphosphine oxide
B1: Nylon 6 (polycaprolactam) having a weight average molecular weight of 38,000.
B2: Compounds containing bound triazine radicals:
B21: Melamine cyanurate and
B22: Melamine
C: Impact-modifying rubber:
C1: Styrene/butadiene/styrene three-block copolymer having a styrene content of 30% by weight (Cariflex ® TR$^{1102}$ from Shell AG).
C2: Ethylene/n-butyl acrylate/maleic anhydride copolymer containing the monomer units in a weight ratio of 67:32.7:0.3 and having a melt flow index MFI 190/2.16 of 10 g/10 min according to DIN 53,735.
D: Additive: zinc oxide.

Components (A1), (A2), (B1) and (B2) and components (C) and (D) were fed individually to a twin-screw extruder (ZSK 53 from Werner & Pfleiderer) at 280° C. and were mixed thoroughly at 280° C. and devolatilized at 290° C. under 0.1 bar, and the resulting molding material was then granulated.

The granules were processed by injection molding to give moldings, on which the flame retardance and total Plastechon W were determined.

The composition of the individual molding materials and the test results obtained are shown in the Table.

TABLE

| Components | | | |
|---|---|---|---|
| A | | B | |
| A1 | A2 | B1 | B2 |

TABLE-continued

| Examples | Amount [parts by wt.] | Type | Amount [parts by wt.] | Type | Amount [parts by wt.] | Amount [parts by wt.] | Type |
|---|---|---|---|---|---|---|---|
| 1 | 45 | A12 | 5 | A21 | 55 | 4 | B21 |
| 2 | 47 | A12 | 4 | A21 | 53 | 5 | B22 |
| 3 | 40 | A11 | 6 | A22 | 55 | 6 | B21 |
| 4 | 50 | A11 | 5 | A22 | 50 | 5 | B21 |
| 5 | 35 | A11 | 5 | A22 | 65 | 6 | B21 |
| 6 | 45 | A11 | 4 | A21 | 55 | 7 | B22 |
| 7 | 60 | A11 | 6 | A22 | 40 | 6 | B22 |
| 8 | 40 | A12 | 6 | A22 | 60 | 7 | B21 |
| Comp. Examples | | | | | | | |
| I | 40 | A12 | — | — | 60 | 7 | B21 |
| II | 40 | A12 | 6 | A22 | 60 | — | — |

| | Components | | | Properties | |
|---|---|---|---|---|---|
| | C1 | C2 | D | | |
| Examples | Amount [parts by wt.] | Amount [parts by wt.] | Amount [parts by wt.] | Total Plastechon W [Nm] | Fire class UL 94 |
| 1 | 7 | 2 | 1 | 46 | V0 |
| 2 | 6 | 1 | — | 41 | V0 |
| 3 | 8 | — | — | 38 | 5V |
| 4 | 10 | 2 | 0 | 42 | 5V |
| 5 | 7 | — | — | 35 | 5V |
| 6 | 7 | — | — | 40 | V0 |
| 7 | 7 | — | — | 40 | 5V |
| 8 | 7 | — | — | 46 | 5V |
| Comp. Examples | | | | | |
| I | 7 | — | — | 34 | None |
| II | 7 | — | — | 37 | None |

We claim:
1. A self-extinguishing, thermoplastic polyphenylene ether/polyamide molding material containing, as essential components,
    (A) from 10 to 90% by weight of component (A), which consists of
        (A1) from 70 to 99% by weight of a modified polyphenylene ether prepared from
            (a$_1$) 4.95-99.95% by weight of polyphenylene ether,
            (a$_2$) 0-90% by weight of a vinylaromatic polymer,
            (a$_3$) 0.05-10% by weight of
                (a$_{31}$) fumaric acid and/or
                (a$_{32}$) a maleimide of the formula I

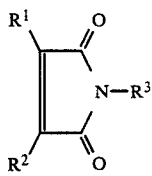

(I)

where $R^1$, $R^2$ and $R^3$ are each hydrogen or an alkyl, alkoxy, cycloalkyl, alkenyl, aryl, arylene or alkylene group of 1 to 12 carbon atoms, and/or
            (a$_{33}$) a monomer containing amide groups and a polymerizable double bond and/or
            (a$_{34}$) a monomer containing lactam groups and a polymerizable double bond and/or
            (a$_{35}$) a half ester or half amide of an α,β-unsaturated dicarboxylic acid,
            (a$_4$) 0-80% by weight of further monomers capable of grafting and
            (a$_5$) 0-20% by weight of a free radical initiator, and
        (A2) from 1 to 30% by weight of a compound containing bound phosphorus, the percentages by weight being based on the total weight of components (A1) and (A2),
    (B) from 90 to 10% by weight of component (B), which consists of
        (B1) from 80 to 99% by weight of one or more polyamides and
        (B2) from 1 to 20% by weight of one or more compounds containing a triazine radical and from the group consisting of cyanuric acid and its derivatives, the percentages by weight being based on the total weight of components (B1) and (B2),
    (C) from 0 to 30% by weight of one or more impact-modifying rubbers and
    (D) from 0 to 60% by weight of one or more additives, the percentages by weight of components (A) to (D) summing to 100% by weight.

2. A self-extinguishing, thermoplastic polyphenylene ether/polyamide molding material as claimed in claim 1, wherein component A1 is a polyphenylene ether modified with fumaric acid.

3. A self-extinguishing, thermoplastic polyphenylene ether/polyamide molding material as claimed in claim 1, wherein component A2 consists of triphenylphosphine oxide and/or triphenyl phosphate.

4. A self-extinguishing, thermoplastic polyphenylene ether/polyamide molding material as claimed in claim 1, wherein component B1 consists of polycaprolactam having a weight average molecular weight of from 10,000 to 80,000.

5. A self-extinguishing, thermoplastic polyphenylene ether/polyamide molding material as claimed in claim 1, wherein component B2 consists of melamine and/or melamine/cyanurate.

6. A self-extinguishing, thermoplastic polyphenylene ether/polyamide molding material containing, as essential components,
    (A) from 10 to 90% by weight of component (A), which consists of
        (A1) from 70 to 99% by weight of a modified polyphenylene ether prepared from ($a_1$) 4.95–99.95% by weight of polyphenylene ether,
($a_2$) 0–90% by weight of a vinylaromatic polymer and
($a_3$) 0.05–10% by weight of fumaric acid and
  (A2) from 1 to 30% by weight of a compound from the group consisting of triphenylphosphine oxide and/or triphenyl phosphate, the percentages by weight being based on the total weight of component (A),
(B) from 90 to 10% by weight of component (B), which consists of
  (B1) from 80 to 99% by weight of one or more polycaprolactams having a weight average molecular weight of 10,000 to 80,000 and
  (B2) from 1 to 20% by weight of melamine and/or melamine cyanurate, the percentages by weight being based on the weight of component (B),
(C) from 0 to 30% by weight of one or more impact-modifying rubbers and
(D) from 0 to 40% by weight of one or more additives, the percentages by weight of components (A) to (D) summing to 100% by weight.

7. A molding produced from a self-extinguishing, thermoplastic polyphenylene ether/polyamide molding material as claimed in claim 1.

* * * * *